United States Patent [19]
Suverison et al.

[11] Patent Number: 4,993,803
[45] Date of Patent: Feb. 19, 1991

[54] ELECTRO-OPTICAL HEADER CONNECTOR

[75] Inventors: Lyle B. Suverison, Fowler; Dominic A. Messuri, Youngstown, both of Ohio; Songchin S. Lu, Scottsdale, Ariz.

[73] Assignee: General Motors Corporation, Detroit, Mich.

[21] Appl. No.: 520,158

[22] Filed: May 7, 1990

Related U.S. Application Data

[63] Continuation of Ser. No. 353,684, May 18, 1989, abandoned.

[51] Int. Cl.⁵ .............................. G02B 6/36; H01J 5/16; H01R 17/18
[52] U.S. Cl. ............................... 350/96.20; 350/96.14; 350/96.15; 439/49; 439/76; 439/78; 439/283; 439/572; 439/577; 250/227.11
[58] Field of Search ............... 350/96.15, 96.14, 96.17, 350/96.20, 96.21, 96.22; 250/227.11; 439/49, 56, 283, 577, 78, 76, 571, 572, 573; 357/17, 19, 30

[56] References Cited

U.S. PATENT DOCUMENTS

| | | | |
|---|---|---|---|
| 2,809,361 | 10/1957 | Woofter et al. ..................... | 439/682 |
| 4,075,477 | 2/1978 | Hanson ............................... | 250/227 |
| 4,081,208 | 3/1978 | Meade ................................. | 350/96.20 |
| 4,127,319 | 11/1978 | Forney et al. ....................... | 350/96.20 |
| 4,191,447 | 3/1980 | Borsuk ................................. | 350/96.20 |
| 4,268,115 | 5/1981 | Slemon et al. ...................... | 350/96.20 |
| 4,273,413 | 6/1981 | Bendiksen et al. ................. | 350/96.20 |
| 4,294,512 | 10/1981 | Logan ................................. | 350/96.20 |
| 4,346,959 | 8/1982 | Daugherty et al. ................ | 439/747 |
| 4,418,983 | 12/1983 | Bowen et al. ....................... | 350/96.21 |
| 4,427,879 | 1/1984 | Becher et al. ...................... | 250/215 |
| 4,435,036 | 3/1984 | Sasakawa ........................... | 350/96.20 |
| 4,461,537 | 7/1984 | Raymer, II et al. ................ | 350/96.20 |
| 4,465,333 | 8/1984 | Caserta et al. ..................... | 350/96.20 |
| 4,479,696 | 10/1984 | Lubin et al. ........................ | 350/96.20 |
| 4,515,434 | 5/1985 | Margolin et al. ................... | 350/96.21 |
| 4,533,209 | 8/1985 | Segerson et al. ................... | 350/96.20 |
| 4,597,631 | 7/1986 | Flores ................................. | 350/96.20 |
| 4,678,264 | 7/1987 | Bowen et al. ...................... | 350/96.20 |
| 4,711,509 | 12/1987 | Cross et al. ........................ | 439/587 |
| 4,721,358 | 1/1988 | Faber et al. ........................ | 350/96.21 |
| 4,767,179 | 8/1988 | Sampson et al. .................. | 350/96.20 |
| 4,767,181 | 8/1988 | McEowen ........................... | 350/96.21 |
| 4,779,948 | 10/1988 | Wais et al. .......................... | 350/96.20 |
| 4,920,262 | 4/1990 | Aiki et al. ........................... | 250/227.11 |

OTHER PUBLICATIONS

Hewlett Packard Technical Data Bulletin–"Snap-In Fiber Optic Links–HFBR–0500 Series" Dated Sep. 1984.
Hewlett Packard Technical Data Bulletin–"Versatile Link–HFBR–0501 Series" Dated Dec. 1986.
SPIE Proceedings vol. 840–"Fiber Optic Systems for Mobile Platforms" Dated Aug. 20, 1987.
Packard Electric Signals, Dated Summer 1988.
SPIE Proceedings vol. 989–"Fiber Optic Systems for Mobile Platforms II" Dated Sep. 6, 1988.
SAE Technical Paper Series No. 890202–"A Fiber Optic Connection System Designed for Automotive Applications" Dated Feb. 27, 1989.
Automotive Engineering vol. 97, No. 3, pp. 53–57–"Connection System" Dated Mar. 1989.
Exhibit I-A Sketch Entitled "Electro-Optic Connection System: Automotive Fiber Optic Link".
Exhibit II-A Sketch Entitled "Electro-Optical System".

Primary Examiner—Brian Healy
Attorney, Agent, or Firm—F. J. Fodale

[57] ABSTRACT

A connection system which includes fiber optic data links comprises a connector plug at the end of fiber optic cables and a mating header connector which house electro/optical devices and which is mounted on a printed circuit board. The header connector makes optical connections between the fiber optic cables of the plug connector and the electro/optical devices and electrical connections between the electro-optical devices and the circuitry of the printed circuit board. The header connector also includes a row of terminals for making purely electrical connections for electric cables which are terminated in the connector plug.

16 Claims, 2 Drawing Sheets

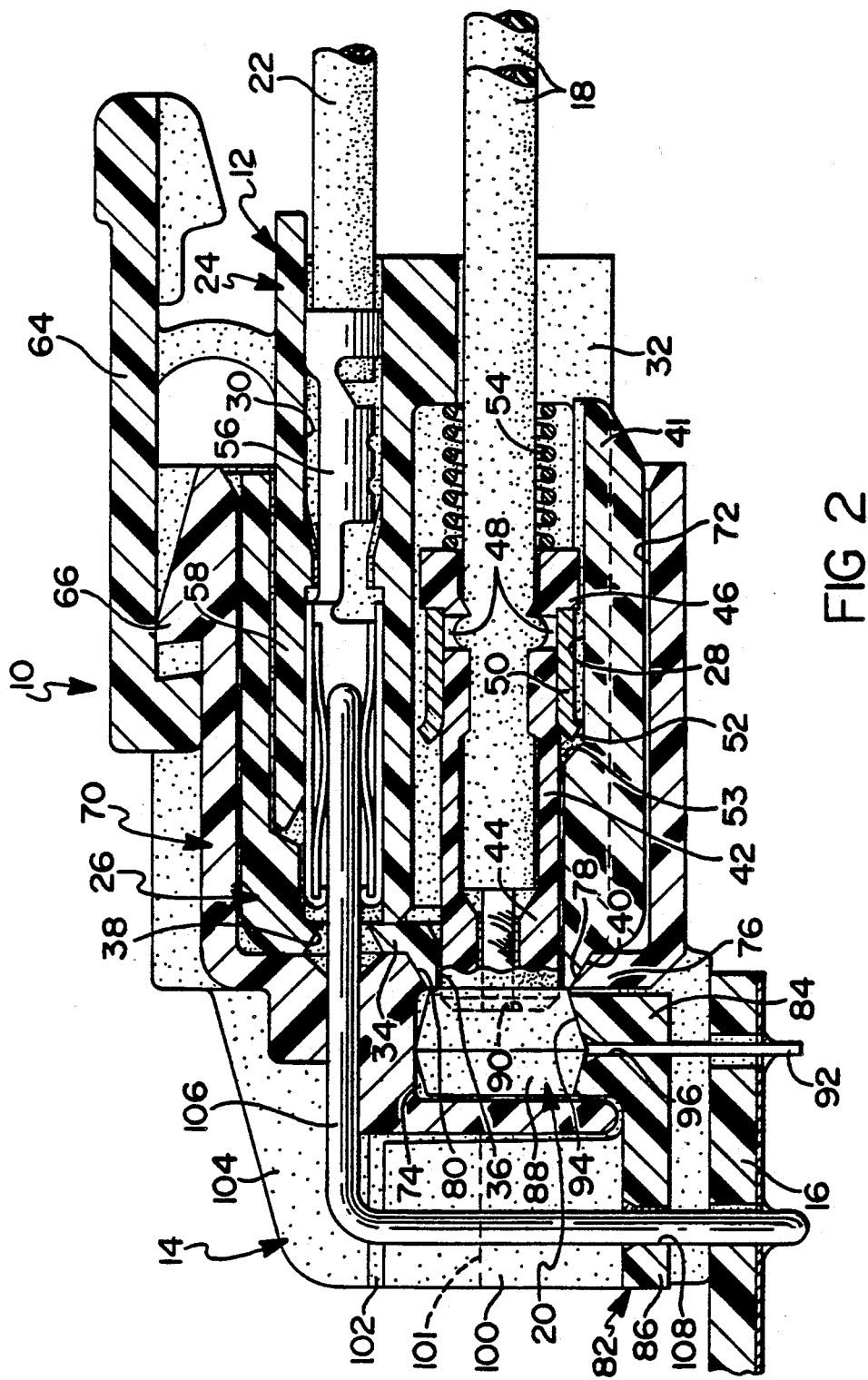

4,993,803

ELECTRO-OPTICAL HEADER CONNECTOR

This is a continuation of Ser. No. 353,684, filed May 18, 1989, now abandoned.

BACKGROUND OF THE INVENTION

This invention relates generally to connection systems and more specifically to connection systems which include at least one fiber optic data link.

Such systems typically comprise a connector plug at the end of a fiber optic cable or cables and a mating header connector which house an electro/optical device or devices and which is mounted on a printed circuit board. The header connector makes an optical connection between the fiber optic cables of the plug connector and the electro/optical devices and an electrical connection between the electro-optical devices and the circuitry of the printed circuit board.

Such systems may also include purely electrical connections for electric cables which are terminated in the connector plug.

SUMMARY OF THE INVENTION

The object of this invention is to provide an improved header connector for a connection system which includes at least one fiber optic data link to an electro/optical device of the lead frame type.

A feature of the invention is that the electro/optical device is mounted on a thermoplastic clip which is detachably mounted to a connector body of the header connector.

Another feature of the invention is that the connector body of the header connector has the electro/optical devices mounted in a magazine chamber which is separated from the socket by a partition wall which provides an optic seal when the connector plug is mated to the header connector.

Yet another feature of the invention is that the electro/optical device or devices are mounted in the magazine chamber by a thermoplastic clip which permits limited movement in the transverse direction so that the electro/optical device or devices adjust themselves for precise engagement with the fiber optic cables of the mating connector plug.

Yet another feature of the invention is that the electro/optical device or devices are mounted in the magazine chamber by a thermoplastic clip which permits limited movement in the vertical direction to substantially eliminate stress in the solder joints of the electro/optical device terminals to the printed circuit board.

Yet another feature of the invention is that the header connector may include purely electrical connections without increasing the footprint of the header connector.

Still yet another feature of the invention is that the thermoplastic clip locates the terminals of the electro/optical device or devices as well as any other electrical terminals carried by the header connector for connection to the printed circuit board.

Other objects and features of the invention will become apparent to those skilled in the art as disclosure is made in the following detailed description of a preferred embodiment of the invention which sets forth the best mode of the invention contemplated by the inventors and which is illustrated in the accompanying sheet(s) of drawing.

BRIEF DESCRIPTION OF THE DRAWINGS

FIG. 2 is a longitudinal section of the connection system which is shown in FIG. 1.

DETAILED DESCRIPTION OF THE PREFERRED EMBODIMENT

Figure 1:
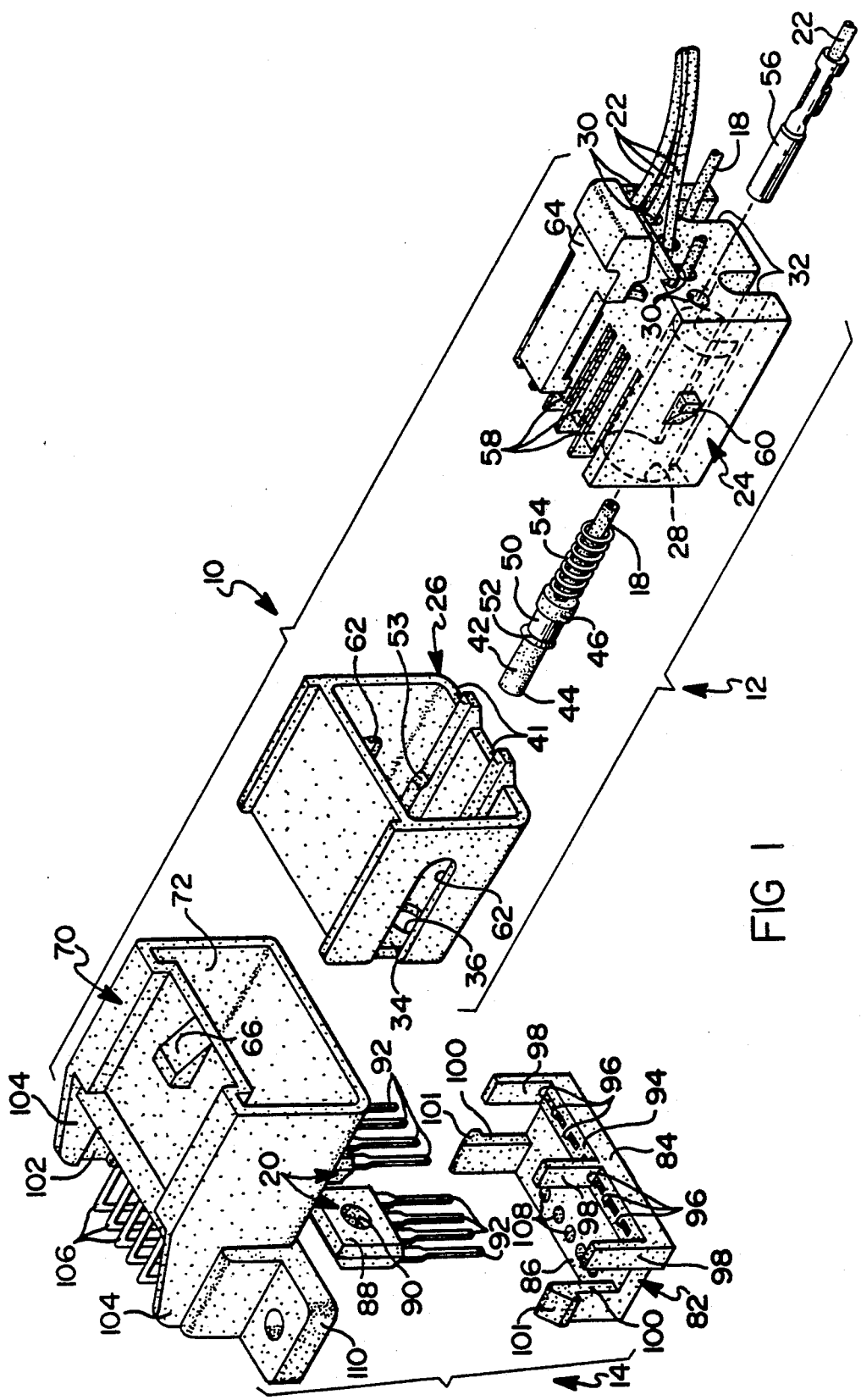
FIG. 1 is an exploded perspective view of a connection system having an improved header connector in accordance with the invention.

Referring now to the drawing, the connection system 10 comprises an improved connector plug which is indicated generally at 12 and which mates with a header connector which is indicated generally at 14 and which is mounted on a printed circuit board 16. The particular connection system 10 which is disclosed in the drawing makes two electro/optical or data link connections and five electrical connections. More specifically, the header connector 14 makes optical connections between the two fiber optic cables 18 of the connector plug 12 and the two electro/optical devices 20 and electrical connections between the electro-optical devices 20 and the circuitry of the printed circuit board 16. On the other hand, the header connector 14 also makes five purely electrical connections for electric cables 22 which are terminated in the connector plug 12.

The connector plug 12 comprises a two piece connector body having a housing member 24 and a cover member 26. The housing member 24 has two vertically spaced rows of longitudinal cavities The lower row has two large cavities 28 for the two fiber optic cables 18 while the upper row has five smaller terminal cavities 30 for the five electric cables 22. Each of the large cavities 28 communicates with a longitudinal assembly slot 32 which one of the fiber optic cables 18 passes through laterally during assembly of the connector plug 12.

The cover member 26 has a forward wall 34 which has two guide holes 36 which communicate with the respective large cavities 28 and five apertures 38 which communicate with the respective smaller terminal cavities 30. The forward wall 34 has conical bosses 40 around the guide holes 36 which protrude outwardly to interfit with the header connector 14 while the apertures 38 are tapered inwardly to guide terminal pins into the smaller terminal cavities 30 as shown in FIG. 2.

The cover member 26 also has two internal ribs 41 which are disposed in the longitudinal assembly slots 32 when the cover member 26 is attached to the housing member 24.

Each fiber optic cable 18 is terminated by a thermoplastic ferrule 42 which has a tip 44 which receives the core of the fiber optic cable 18, a rearward flange 46 and two radial holes 48 between the tip and the flange. The ferrule 42 is secured onto the end of the fiber optic cable 18 by a metal crimp ring 50 which is disposed in front of the flange 46 over the radial holes 48 and crimped. The forward edge of the crimp ring 50 is flared outwardly to provide a stop 52 which cooperates with a stop 53 of the cover member rib 40.

Each fiber optic cable 18 also carries a coil spring 54 behind the attached ferrule 42. The spring 54 is thus captured and easily handled throughout the assembly process when the fiber optic cable 18 is terminated at both ends which is the usual case.

The ferrules 42 and springs 54 are simultaneously assembled into the longitudinal cavities 28 of the housing member 24 by passing the fiber optic cables 18 laterally through the assembly slots 32 and then pulling the cables 18 back so that the ferrules 42 and springs 54 are pulled to seat in the longitudinal cavities 28 through the forward open ends of the longitudinal cavities.

Socket terminals 56 are attached to the ends of the electrical conductors 22 by conventional crimping techniques as best shown in FIG. 2. The electric socket terminals 56 are inserted into the terminal cavities 30 through the rearward open ends and retained in the terminal cavities 30 by flexible lock arms 58 of the housing member 24.

The cover member 26 is then attached by sliding the housing member 24 into the cover member 26 until it is retained by lock nibs 60 of the housing member 24 which snap into side slots 62 of the cover member 26. The tips 44 of the ferrules 42 pass through the guide holes 36 of the assembled cover member 26. The ferrules 42 are slideably disposed in the two-piece connector body by virtue of the rearward flanges 46 which have a slip fit in the respective longitudinal cavities 28 and the tips 44 which have a looser slip fit in the guide holes 36. The springs 54 engage the rearward flanges 46 of the ferrules 42 to bias the ferrules 42 in the forward direction (to the left as viewed in FIG. 2) so that the tips 44 project forwardly of the forward wall 34 of the cover member 26 under the bias of the springs 54 in the manner of a spring biased plunger.

The projection of the tips 44 and the displacement of the ferrules 42 with respect to the two piece connector body in the forward direction is limited by the cooperating stops 52 and 53 of the crimp rings 50 and cover ribs 40. The desired amount of spring biased projection for the tips 44 to engage the electro/optic devices 20 properly is easily provided by adjusting the location of the stops 53 anywhere along the cover ribs 40. The proper engagement of the tips 44 is also enhanced by the looser slip fit of the tips 44 in the guide holes 36 which allows for fine adjustment of the tips 44 in the radial or transverse direction.

The retained cover member 26 also holds the flexible lock arms 58 down firmly securing the electrical socket terminals 56 in the terminal cavities 30.

The connector plug 12 includes a conventional lock arm 64 of the pump handle type which is integrally attached to the housing member 24. The lock arm 64 cooperates with a lock nib 66 of the header connector 12 to retain the connectors 12 and 14 in the mated position shown in FIG. 2.

The header connector 14 comprises a connector body 70 which has a longitudinal socket 72 for receiving the connector plug 12, a magazine chamber 74 which is behind the socket and which has an opening in the bottom of the connector body, and a partition wall 76 which is between the magazine chamber and the socket. The partition wall 76 has a row of windows 78 which extend through the partition wall 76 to establish communication between the socket 72 and the magazine chamber 74. Each window 78 has a tapered sealing surface 80 which sealingly engages one of the tapered bosses surrounding the guide holes 36 of the connector plug 12 when the connector plug 12 is mated to the header connector 14 as shown in FIG. 2.

The header connector 14 further comprises a thermoplastic clip 82 which has a holder portion 84 for the electro/optical devices 20 which is disposed in the magazine chamber when the clip is assembled to the connector body and a latch portion 86 for retaining the clip 82 in assembly with the connector body 70.

The electro/optical devices 20 for establishing fiber optic data links are of the lead frame type. Each electro/optical device 20 has a thermoplastic housing 88 which includes an integrally molded fiber optic lead-in 90 and a metal lead frame which is partially embedded in the thermoplastic housing so that the lead frame has a plurality of terminal blades 92 depending from the thermoplastic housing 88.

The holder portion 84 of the clip has two cradles for holding the thermoplastic housings 88 of the electro/optical devices 20 in the magazine chamber 74 so that the fiber optic lead-ins 90 are aligned with the respective windows 78 through the partition wall 76. The fiber optic lead-ins 90 position the tips 44 of the respective ferrules 42 of the connector plug 12 when it is mated to the header connector 14 as shown in FIG. 2.

The cradles have a floor which has a trough shaped surface 94 for supporting the electro/optical devices 20 and slots 96 which the terminal blades 92 of the electro/optical devices 20 pass through for locating the terminal blades 92 for connection to the printed circuit board 16. The holder portion 84 also has laterally spaced vertical walls 98 so that the cradle locate each electro/optical device 20 in the lateral direction.

The latch portion 86 which is behind the holder portion is U-shaped and has two lock arms 100 with end catches 101 which engage in oversize slots 102 in the rearwardly extending side wings 104 of the connector body 70 which are behind the magazine chamber 74. The catches 101 of the lock arms 100 engage in the oversize slots 102 so that clip 82 is retained in assembly with the connector body 70 in a manner which permits limited movement in the transverse direction. This capability permits fine adjustment of the fiber optic lead-ins 90 with respect to the windows 78 upon engagement of tips 44 of the ferrules 42 so that the cores of the fiber optic cables 18 are accurately centered in the lead-ins 90 when connector plug 12 is connected to the header connector 14.

Furthermore, this capability substantially eliminates stress in the solder joints of the terminal blades 92 to the printed circuit board 16 due to differential thermal expansion during operation or processing.

The header connector 14 also has a row of pin terminals 10 which project into the socket 72 of the connector body 70 above the row of windows 78 for connection with the socket terminals 56 of the connector plug 12. The pin terminals 106 have perpendicular tails which are located between the side wings 104 behind the magazine chamber 74. The U-shaped latch portion 86 of the clip 82 has a floor which has holes 108 which the perpendicular tails of the pin terminals 106 pass through for locating ends of the perpendicular tails for connection to the printed circuit board 16 as shown in FIG. 2.

The connector body 70 of the header connector 14 has flanges 110 integrally attached to the side wings 104 and the sides of the magazine chamber 74 adjacent the opening of the magazine chamber 74 which is in the bottom of the connector body. The flanges 110 are used to attach the header connector 14 to the printed circuit board 16 with its bottom facing the printed circuit board 16 as shown in FIG. 2.

The improved header connector of the invention is not limited to the exact details of construction shown and described, for obvious modifications will occur to a person skilled in the art.

The embodiments of the invention in which an exclusive property or privilege is claimed are defined as follows:

1. A header connector for a connection system which includes at least one fiber optic data link to an electro/optical device having a thermoplastic housing which has a fiber optic lead-in and a lead frame which is partially embedded in the thermoplastic housing so that it has a plurality of terminal blades depending from the thermoplastic housing comprising:

a connector body which has a socket for receiving a mating plug connector, a magazine chamber which is behind the socket, and a wall which is between the magazine chamber and the socket, the wall having a window which extends through the wall to establish communication between the socket and the magazine chamber and which has a tapered sealing surface for sealingly engaging a surface of a mating connector plug, and a clip which has a holder portion which is disposed in the magazine chamber when the clip is assembled to the connector body and a latch portion for retaining the clip in assembly with the connector body, the holder portion having a cradle for holding the thermoplastic housing of the electro/optical device in the magazine chamber so that the fiber optic lead-in is aligned with the window, the cradle having a floor which has slots which the terminal blades of the electro/optical device pass through for locating the terminal blades for connection to a printed circuit board, and the latch portion having lock arms which engage the connector body so that clip is retained in assembly with the connector body with a limited movement which permits adjustment of the fiber optic lead-in with respect to the window in the transverse direction upon engagement of a fiber optic cable of a mating plug connector, and the connector body having flanges for attaching the header connector to a printed circuit board.

2. The header connector as defined in claim 1 wherein the floor of the cradle has a trough shaped surface for supporting the electro/optical device and the cradle has laterally spaced vertical walls which locate the electro/optical device in the lateral direction.

3. The header connector as defined in claim 2 wherein the latch portion is a U-shaped portion which is behind the holder portion and wherein the lock arms engage cooperating portions of the connector body which are behind the magazine chamber.

4. The header connector as defined in claim 3 wherein the connector body has a row of pin terminals which project into the socket of the connector body above the window and which have perpendicular tails which are behind the magazine chamber, and wherein the latch portion of the clip has a floor which has holes which the perpendicular tails of the pin terminals pass through for locating ends of the perpendicular tails for connection to a printed circuit board.

5. A header connector for a connection system which includes fiber optic data links to electro/optical devices having thermoplastic housings which have fiber optic lead-ins and lead frames which are partially embedded in the thermoplastic housing so that the lead frames have pluralities of terminal blades depending from the thermoplastic housings comprising:

a connector body which has a socket for receiving a mating plug connector, a magazine chamber which is behind the socket and which has an opening in the bottom of the connector body, and a partition wall which is between the magazine chamber and the socket, the partition wall having a row of windows which extend through the partition wall to establish communication between the socket and the magazine chamber and which each have a tapered sealing surface for sealingly engaging a tapered boss of a mating connector plug, and a thermoplastic clip which has a holder portion which is disposed in the magazine chamber when the clip is assembled to the connector body and a latch portion for retaining the clip in assembly with the connector body, the holder portion having cradles for holding the thermoplastic housings of the electro/optical devices in the magazine chamber so that the fiber optic lead-ins are aligned with respective windows of the partition wall, the cradles having a floor which has slots which the terminal blades of the electro/optical devices pass through for locating the terminal blades for connection to a printed circuit board, and the latch portion having lock arms which engage the connector body so that the clip is retained in assembly with the connector body with a limited movement which permits adjustment of the fiber optic lead-ins with respect to the windows in the transverse direction upon engagement of fiber optic cables of a mating plug connector, and the header connector having flanges adjacent the opening of the magazine chamber for attaching the header connector to a printed circuit board with its bottom facing the printed circuit board.

6. The header connector as defined in claim 5 wherein the floor of the cradles has a trough shaped surface for supporting the electro/optical devices and the cradles have laterally spaced vertical walls which locate each electro/optical device in the lateral direction.

7. The header connector as defined in claim 6 wherein the latch portion is a U-shaped portion which is behind the holder portion and wherein the lock arms engage cooperating portions of the connector body which are behind the magazine chamber.

8. The header connector as defined in claim 7 wherein the connector body has a row of pin terminals which project into the socket of the connector body above the row of windows and which have perpendicular tails which are behind the magazine chamber, and wherein the latch portion of the clip has a floor which has holes which the perpendicular tails of the pin terminals pass through for locating ends of the perpendicular tails for connection to a printed circuit board.

9. A header connector for a connection system which includes fiber optic data links to electro/optical devices having thermoplastic housings which have fiber optic lead-ins and lead frames which are partially embedded in the thermoplastic housing so that the lead frames have pluralities of terminal blades depending from the thermoplastic housings comprising:

a connector body which has a socket for receiving a mating plug connector, a magazine chamber which is behind the socket, and a wall which is between the magazine chamber and the socket, the wall having a row of windows which extend through the wall to establish communication between the socket and the magazine chamber, the connector body having a row of pin terminals which project into the socket of the connector body above the row of windows and which have perpendicular tails which are behind the magazine chamber, and a clip which has a holder portion which is disposed in the magazine chamber when the clip is assembled to the connector body and a latch portion behind the holder portion for retaining the clip in assembly with the connector body, the holder portion having cradles for holding the thermoplastic housings of the electro/optical devices in the magazine chamber so that the fiber optic lead-ins are aligned with respective windows, the cradles having a floor which has slots which the terminal blades of the electro/optical devices pass through for locating the terminal blades for connection to a printed circuit board, and the latch portion having lock arms which engage the connector body behind the magazine chamber and a floor which has holes which the perpendicular tails of the pin terminals pass through for locating ends of the perpendicular tails for connection to the printed circuit board, and the header connector having flanges adjacent the magazine chamber for attaching the header connector to the printed circuit board.

10. The header connector as defined in claim 9 wherein the floor of the cradles has a trough shaped surface for supporting the electro/optical devices and the cradles have laterally spaced vertical walls which locate each electro/optical device in the lateral direction.

11. A header connector for a connection system which includes at least one fiber optic data link to an electro/optical device having a thermoplastic housing which has a fiber optic lead-in and a lead frame which is partially embedded in the thermoplastic housing so that it has a plurality of terminal blades depending from the thermoplastic housing comprising:

a connector body which has a socket for receiving a mating plug connector, a magazine chamber which is behind the socket, and a wall which is between the magazine chamber and the socket, and the wall having a window which extends through the wall to establish communication between the socket and the magazine chamber and which has a tapered sealing surface for sealingly engaging a surface of a mating connector plug.

12. A header connector for a connection system which includes at least one fiber optic data link to an electro/optical device having a thermoplastic housing which has a fiber optic lead-in and a lead frame which is partially embedded in the thermoplastic housing so that it has a plurality of terminal blades depending from the thermoplastic housing comprising:

a connector body which has a socket for receiving a mating plug connector, a magazine chamber which is behind the socket, and a wall which is between the magazine chamber and the socket, the wall having a window which extends through the wall to establish communication between the socket and the magazine chamber, a clip which has a holder portion which is disposed in the magazine chamber when the clip is assembled to the connector body and means for retaining the clip in assembly with the connector body, and the holder portion having a cradle for holding the thermoplastic housing of the electro/optical device in the magazine chamber so that the fiber optic lead-in is aligned with the window.

13. The header connector as defined in claim 12 wherein the clip is retained in assembly with the connector body with a limited movement which permits adjustment of the fiber optic lead-in with respect to the window in the transverse direction upon engagement of a fiber optic cable of a mating plug connector.

14. A header connector for a connection system which includes at least one fiber optic data link to an electro/optical device having a thermoplastic housing which has a fiber optic lead-in and a lead frame which is partially embedded in the thermoplastic housing so that it has a plurality of terminal blades depending from the thermoplastic housing comprising:

a connector body which has a socket for receiving a mating plug connector, a magazine chamber which is behind the socket, and a wall which is between the magazine chamber and the socket, the wall having a window which extends through the wall to establish communication between the socket and the magazine chamber, a clip which has a holder portion which is disposed in the magazine chamber when the clip is assembled to the connector body and means for retaining the clip in assembly with the connector body, the holder portion having a cradle for holding the thermoplastic housing of the electro/optical device in the magazine chamber so that the fiber optic lead-in is aligned with the window, and the cradle having a floor which has slots which the terminal blades of the electro/optical device pass through for locating the terminal blades for connection to a printed circuit board.

15. The header connector as defined in claim 14 wherein the clip is retained in assembly with the connector body with a limited movement which permits adjustment of the fiber optic lead-in with respect to the window in the transverse direction upon engagement of a fiber optic cable of a mating plug connector.

16. A header connector for a connection system which includes at least one fiber optic data link to an electro/optical device having a thermoplastic housing which has a fiber optic lead-in and a lead frame which is partially embedded in the thermoplastic housing so that it has a plurality of terminal blades depending from the thermoplastic housing comprising:

a connector body which has a socket for receiving a mating plug connector, a magazine chamber which is behind the socket, and a wall which is between the magazine chamber and the socket, the wall having a window which extends through the wall to establish communication between the socket and the magazine chamber, and means for holding the thermoplastic housing of the electro/optical device in the magazine chamber so that the fiber optic lead-in is aligned with the window and has a limited movement which permits adjustment of the fiber optic lead-in with respect to the window in the transverse direction upon engagement of a fiber optic cable of a mating plug connector.

* * * * *